Feb. 7, 1950 R. E. TRESISE ET AL 2,496,683
HEARING AID CHASSIS AND ASSEMBLY
Filed March 6, 1947 3 Sheets-Sheet 2

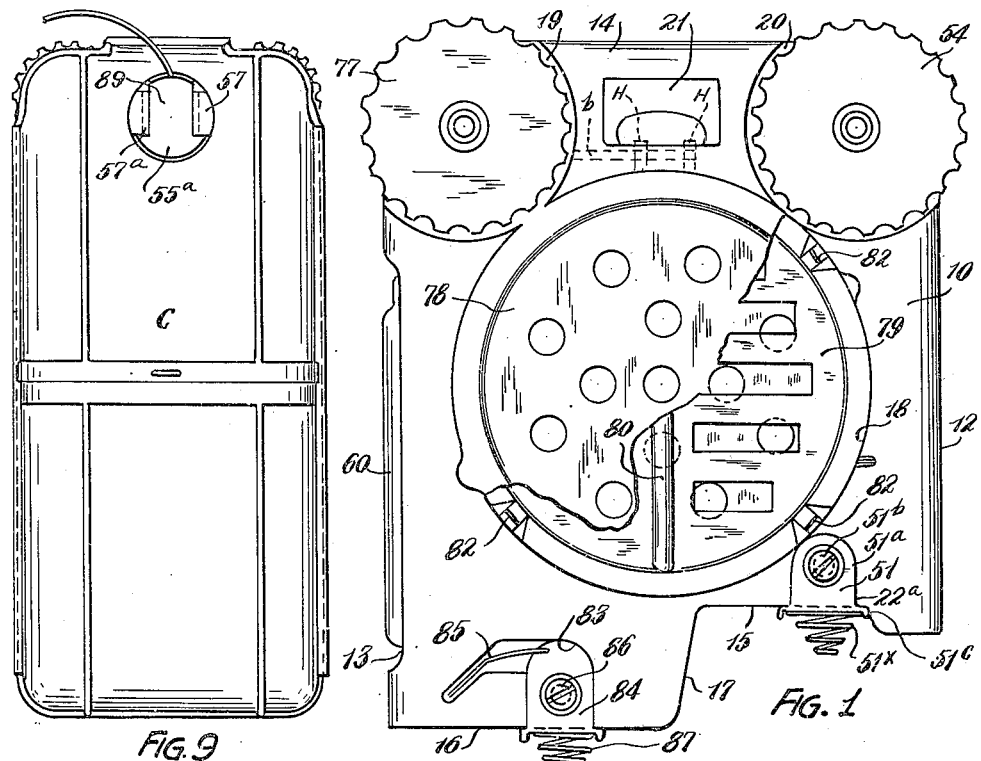
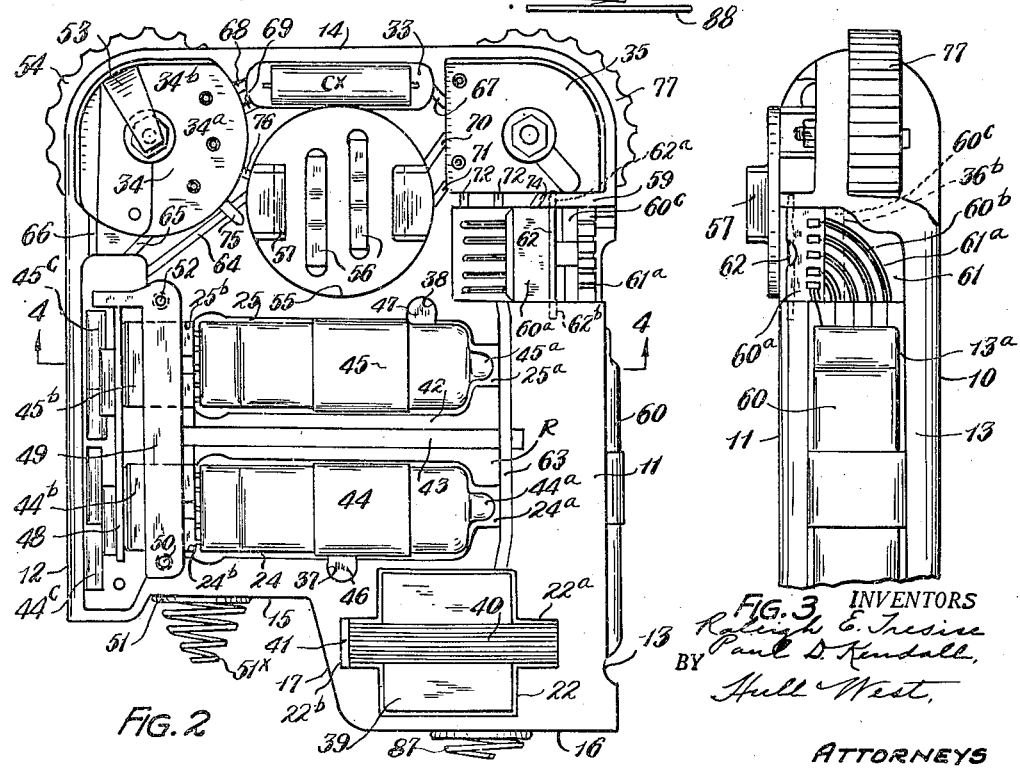

INVENTORS
Raleigh E. Tresise
BY Paul O. Kendall
Hull West
ATTORNEYS

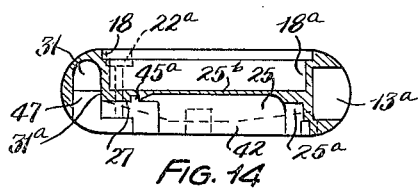
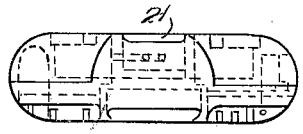
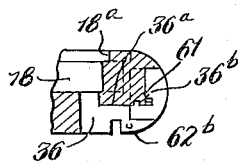
FIG. 14    FIG. 13    FIG. 15
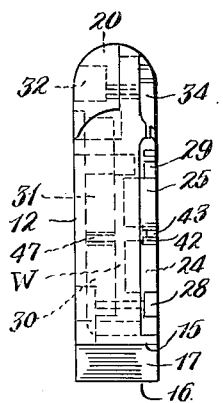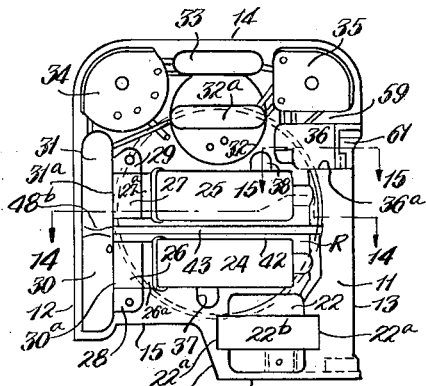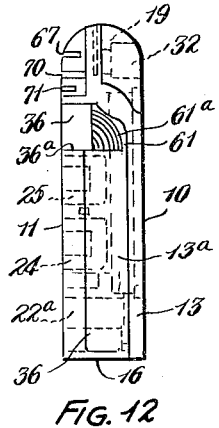
FIG. 11    FIG. 10    FIG. 12
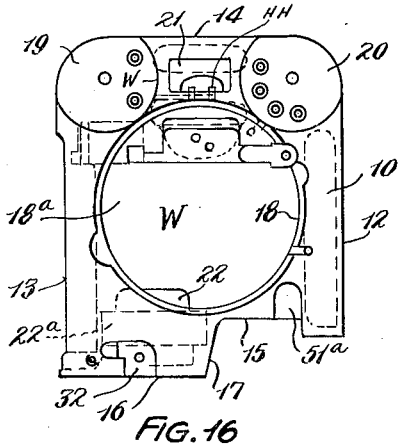
FIG. 16

Patented Feb. 7, 1950

2,496,683

UNITED STATES PATENT OFFICE 2,496,683

HEARING AID CHASSIS AND ASSEMBLY

Raleigh E. Tresise, Cleveland Heights, and Paul D. Kendall, Maple Heights, Ohio, assignors to Paravox, Inc., Cleveland, Ohio, a corporation of Ohio Application March 6, 1947, Serial No. 732,718

1 Claim. (Cl. 179—107)

This invention relates to hearing aid apparatus, and has for one of its objects the production of an apparatus of this kind wherein all of the operating elements will be located within and protected by a chassis made of moldable insulating material, preferably plastic material, and provided with recesses and openings within which the said elements are located and which will eliminate the use of brackets and other parts whereon the said elements have been mounted on and secured to chassis.

In our application Serial No. 636,459, filed December 21, 1945, we have shown and described a hearing aid apparatus wherein the chassis is made of moldable insulating material and which is so constructed and combined with the hearing aid elements therewithin as to enable the chassis, the elements, and the A and B batteries to so cooperate as to permit them to be assembled in a compact container which can be worn without appreciable discomfort and which can be carried in the vest pocket of the wearer.

It is an object of the present invention to provide a construction of chassis and an arrangement of hearing aid elements therewithin which will enable a materially thinner assembly of chassis and hearing aid elements to be produced, permitting the employment therewith of a correspondingly thinner casing; and to accomplish these results without detriment to the satisfactory operation of the apparatus.

A further object of the invention is to incorporate in our apparatus and within the chassis an efficient tone-and-sensitivity-controlling element.

Figure 8:
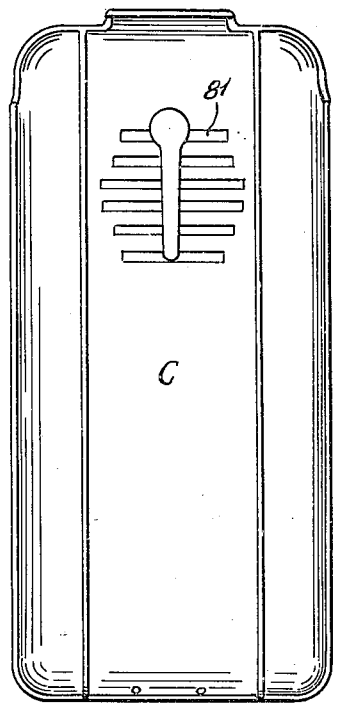
Figure 4:
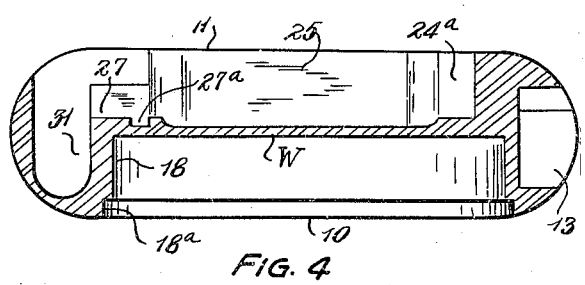
Figure 5:
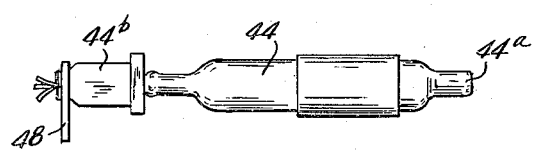
Figure 6:
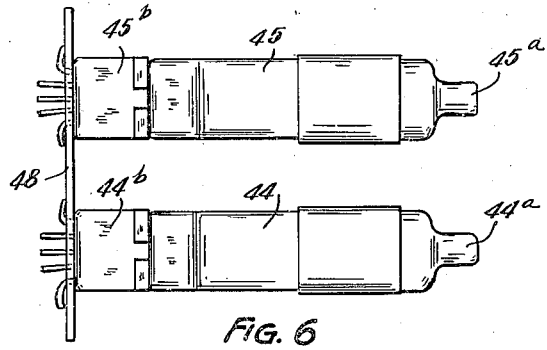
Figure 7:
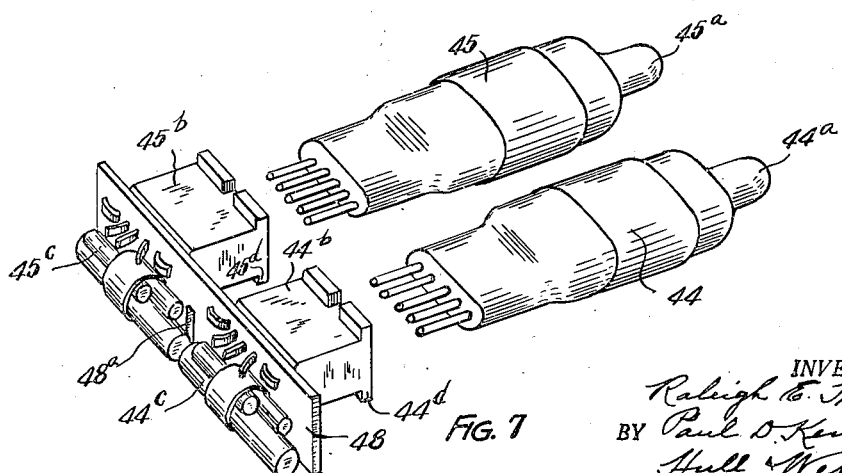

Further and more limited objects and advantages of our invention will be set forth in the detailed description of the same in connection with the annexed drawings, wherein Fig. 1 is a front elevational view, on an enlarged scale, of the main chassis, showing the positions of the hearing aid elements which are located in recesses thereof; Fig. 2 a similar view of the opposite or rear side of the said chassis and hearing aid elements; Fig. 3 a side elevational view of the upper part of the main chassis and the parts therewithin, as illustrated in Figs. 1 and 2; Fig. 4 a detail in section corresponding to the line 4—4 of Fig. 2, with the hearing aid elements omitted; Fig. 5 a side elevational view of the sub-chassis assembly, and Fig. 6 a plan view of the said assembly; Fig. 7 a detail in perspective on an enlarged scale of the sub-chassis assembly and the hearing aid elements cooperating with and supported thereby; Fig. 8 a front elevational view of the casing wherein the main and sub-chassis, the hearing aid elements thereon and the A and B batteries are installed; Fig. 9 a similar view of the rear of the said casing and showing the output connector element and a portion of the ear phone cord; Fig. 10 a rear elevational view of the main chassis, on a reduced scale; Figs. 11 and 12 are opposite side elevational views of the main chassis; Fig. 13 a top plan view of the main chassis; Figs. 14 and 15 are details in section corresponding respectively to the lines 14—14 and 15—15 of Fig. 10; and Fig. 16 a front elevational view of the main chassis.

Describing by reference characters the various parts illustrated herein, 10 denotes the front face, 11 the rear face, 12 and 13 the sides, 14 the top, and 15 and 16 the stepped bottom of the main chassis, the bottom walls of the steps of the bottom being connected by the inclined wall 17.

The chassis shown herein is molded from plastic material and is provided with recesses and openings in the rear, front and sides thereof for the reception of the various hearing aid elements. The recesses in the front of the chassis are indicated at 18, 19, 20, 21, 22 and 22ª (see Fig. 16) while the recesses and seats in the rear are indicated at 23, 24, 25, 26, 27, 28, 29, 30, 31, 32, 32ª, 33, 34, 35, 36, 37 and 38 (see Figs. 2 and 10).

Referring more particularly to Fig. 2, wherein a number of the hearing aid elements are shown as installed within the recesses provided therefor in the rear of the chassis, 39 denotes the core of an output impedance which also comprises a laminated coil 40 of rectangular shape, the vertical branches and the bottom whereof are mounted in vertical and forwardly projecting extensions 22ª and 22ᵇ of the recess 22 which receives the core of the impedance which is mounted in the recess 22, the said coil comprising laminations in the form of a rectangular frame sealed in place by a sealing member 41, interposed between an end of a vertical portion of the coil and an end of an extension 22ª.

The recess R is provided with depressed seats 24 and 25 located on opposite sides of a peripheral wall 42 the top of which is provided with a wire-channel 43. Each seat is provided with an extension 24ª, 25ª, respectively, for the closed extensions 44ª and 45ª, respectively, of tubes 44 and 45 the bodies of which are received in the seats 24 and 25, respectively.

26 and 27 denote outboard extensions respectively of the seats 24, 25 and receive thereon the sockets 44ᵇ and 45ᵇ of the tubes 44 and 45. The recesses 37 and 38 extend outwardly from the walls of the recess R which are remote from each other and receive therewithin wedging insertions 46, 47, respectively, which are preferably of yieldable material, and which serve to anchor the bodies of the tubes 44 and 45 within their respective seats 24 and 25.

The sockets 44$^b$ and 45$^b$ are secured, by the contact wires from the tubes 44 and 45, to a base 48 of insulating material which extends at right angles to the direction of the contact-wire receiving holes in said sockets and which also carries hearing aid elements, such as condensers or resistors, indicated generally and collectively at 44$^c$ and 45$^c$.

The base 48, with the parts attached thereto, constitutes the sub-chassis assembly, the tubes and the sockets being supported within and upon the seats 24, 25, 26 and 27 while the base 48 and the elements attached thereto are received within the recesses 30 and 31, respectively. The base is provided with a notch 48$^a$ extending upwardly from the center of the bottom thereof for the reception of a partition wall 48$^b$ located between the recesses 30 and 31 and extending from the wall defining the bottom of said recesses to a point below the seats 26, 27. The inboard ends of the sockets abut against short vertical walls 24$^b$ and 25$^b$ at the outboard ends of the seats 24 and 25, respectively, with their lower flanges 44$^d$ and 45$^d$ fitted in seats 26$^a$, 27$^a$ adjacent to said vertical walls, and the sockets and the base 48 are fitted snugly in place by this construction and by the simultaneous engagement of the base with the vertical walls 30$^a$ and 31$^a$ at the inboard ends of the recesses 30 and 31—see Figs. 2, 10 and 14. The partition wall 48$^b$ strengthens the relatively thin insulating base 48 and also separates the hearing aid elements and the parts thereof attached to one side of said base from those which are attached to the other side of said base.

The sub-chassis carries the majority of the active elements of the apparatus and it and its elements are anchored in place, not only by the wedging insertions 46 and 47, but also by an anchor bar 49, extending across the sockets 44$^b$ and 45$^b$ with its ends supported in the recesses 28 and 29, the bar being of conducting material and having one end thereof connected by means of a screw 50 with the B-battery contact mounting bracket 51 while its other end is secured to the body of the chassis by means of a screw 52. The screw 50 connects the B-battery with certain elements of the sub-chassis while the screw 52 connects the said battery with other elements of the apparatus. The bracket 51 is mounted in the recess 51$^a$ provided therefor in the front face of the chassis and is secured to the base of the shorter step of the bottom of the chassis by a screw 51$^b$ and having connected thereto the seat 51$^c$ for a contact spring 51$^x$ which is adapted to engage a cooperating terminal on the end of the B-battery.

53 denotes a contact spring which is secured to and projects from the wall defining the top portion of the recess 34 and which spring serves to effect a ground with the casing for the cooperating hearing aid elements which are assembled within the recesses of the chassis. The bottom wall 34$^a$ of this recess also forms the bottom wall for the recess 20 which projects into the body of the main chassis from the front thereof and in which recess there is mounted the rotatable tone-control tap switch 54. The openings for the wire leading to the contact segment of the switch and from the cooperating switch points are indicated at 34$^b$.

The recess 32 is for the reception of the output socket connector 55 which is provided with terminals 56 for frictional engagement by corresponding terminals in the base of the earphone connector element 55$^a$ which base is detachably secured to the output socket or element 55 by means of guides 57 on the latter element which are engaged by rails 57$^a$ projecting from said base—as shown and described in our application Serial No. 636,459.

As will be seen by reference to Fig. 10, a recess 32$^a$ extends across and projects forwardly from the bottom wall of the recess 32. This recess is for the reception of a condenser.

Located between the recess 32 and the side 13 of the chassis is a wall 59 which also forms the bottom wall of the recess 35. The recess 36 is located below this wall and its bottom wall 36$^a$ forms a support for the socket 60$^a$ of an output tube 60 which is mounted in the side recess 13$^a$. It will be noted from Fig. 3 that the socket is offset toward the rear face of the main chassis with respect to the top of the tube 60 and is supported with the openings therein at right angles to the direction of the wires 60$^b$ as they emerge from the upper end of the tube. In order to support these wires in such manner as to avoid a short circuit due to contact between the same, they are mounted in guide grooves 61$^a$ provided in a wall 61 which extends across and above the top of the tube 60 from the side 13 of the main chassis. Due to this manner of forming and locating the recesses 13$^a$ and 36 and the supporting wall 61, the wires from the tube 60 are led to the proper openings in the socket 60$^a$ without danger of short circuiting and the socket is supported in a position to enable the leads therefrom to be conveniently connected with the elements with which they respectively cooperate. The wall 36$^a$ is provided with a notch 36$^b$ for the reception of the flange 60$^c$ on the outboard end of the socket (see Figs. 3, 12 and 15).

The socket 60$^a$ is conveniently and removably anchored in place by means of an anchor rod 62 extending thereacross and having one end supported within an opening 62$^a$ extending through the wall 59 and its opposite end supported in an opening 62$^b$ provided therefor in the rear portion of the wall 13 which partially encloses the tube 60.

The main chassis is also provided with the recess 33 projecting thereinto from the rear surface thereof adjacent to the top of the chassis. This recess is for the reception of a condenser, indicated at C$^x$.

The chassis is also provided with various grooves or channels and openings for wires by which the various hearing aid elements are connected, one of said channels being shown at 63 and other channels or grooves and openings being shown at 64—76, inclusive.

77 denotes a rotatable volume control switch which is mounted in the recess 19 extending rearwardly from the front face of the main chassis.

The recess 21 is for the reception of a mercury switch, which is vacuum-sealed in said recess and which operates in all positions of the chassis except in one of the substantially horizontal positions of the latter. If desired to cut out the mercury switch current control, shorting means are provided between the contacts $h$, $h$ of the switch, which shorting means may consist of a conductive pin p which can be inserted into a bore b provided therefor in the wall w and into which bore the contacts h, h extend.

The recess 18 is for the reception of a microphone, which is constructed in exactly the same manner and mounted in the recess in substantially the same manner as described and claimed in our application Serial No. 636,459.

As will appear by reference to Figs. 1, 4 and 16, the recess 18 comprises a short external cylindrical surface 18ª which receives the perforated cover plate 78 of the microphone, the body of which is supported within the said recess. It will be noted that the bottom of the recess 18 is on the opposite side of the web W from the bottom of the recess R. The microphone is also provided with a fancy grill 79 which in turn is provided with a central rib 80 which is adapted to engage the grill 81 on the casing C whereby the body of the former grill is maintained in proper relation with respect to the body of the latter grill by springs, indicated at 82. Further details of the manner of constructing and mounting the microphone within the main chassis and its cooperative relation to the grill in the casing C are set forth in our copending application 636,459, and further detailed description of the same herein is unnecessary.

The front of the chassis is provided in the bottom portion 16 thereof with a recess 83 for the reception of the A-battery contact mounting bracket 84 and the conductor wire 85 leading therefrom, the bracket being secured to the chassis by means of a screw 86 and supporting at its base a spring 87 carrying a contact plate 88, which contact plate is shown as being of sufficient length to enable it to engage simultaneously the contacts of a multiple cell battery, such as a twin cell battery, and which contact plate, due to its spring support, will automatically accommodate itself to variations in the positions of the ends of the battery terminals, and will also cooperate with the terminal of a single cell battery. The A-battery and the B-battery are interposed between their respective contacts and the lower portion of the casing in the same manner as shown and described in our prior application aforesaid, and as indicated in dotted lines in Fig. 9.

The circuit is a conventional vacuum tube amplifier circuit and the volume control is conventional.

The tone control switch is a rotatable three-position tap switch, the rotatable contact segment of which is grounded to the casing by the spring 53. When the contact segment of the switch is connected to the first switch point, it functions as an on-and-off switch and provides the widest range of amplification with maximum power. Further rotation of the switch and its segment connects to the latter also to the second switch point, which reduces the intensity of the higher sound frequencies. Further rotation of the switch and its segment connects the latter also to the third switch point. In this position of the switch, it provides the widest range of amplification at reduced power, with a resulting decrease in noise level. The tone control is, in fact, a combined tone and sensitivity control.

While the apparatus shown and described herein embodies two tubes (44 and 45) and while we have actually included two such tubes in apparatus which we have built, nevertheless, satisfactory results can be obtained by the use of only one tube.

For convenience of description, the hearing aid apparatus is assumed to be in an upright position, with the microphone, output impedance, volume controlling and tone controlling elements in the front thereof and with the other elements in the rear thereof; and the terms "top" and "bottom" and "front" and "rear" have been employed in the specification and in the claim, but without any intention thereby of limiting the position which the apparatus may assume in actual use.

Having thus described our invention, what we claim is:

In a hearing aid apparatus, a main chassis of moldable insulating material having front and rear faces and provided with recesses and openings therein for the reception of hearing aid elements included in the amplifier circuit, said elements comprising a microphone, a vacuum tube amplifier, and an output connector and means for anchoring the said elements within said recesses, and the said main chassis also having recesses projecting thereinto from one of the faces thereof for the reception of a sub-chassis assembly comprising a tube and hearing aid elements included in the amplifier circuit, one of the last mentioned recesses being for the reception of the sub-chassis and said tube and the other of said recesses being for the reception of the means for anchoring the sub-chassis and hearing aid elements supported thereby within the said recesses and to the main chassis, said anchoring means also effecting electrical connection between one or more hearing aid elements in the main chassis and the hearing aid elements on the sub-chassis, the recess for the tube having a depressed seat for the tube socket extending between the outboard end of the seat for the tube and the recess for the reception of the insulating base and the elements supported thereby, the means for anchoring the sub-chassis assembly comprising an anchor bar of conducting material and the main chassis being provided with recesses for the reception of the ends of the anchor bar projecting thereinto at the ends of the seat for the socket, and means for securing the anchor bar in position and for effecting thereby electrical connections between one or more hearing aid elements in the main chassis and the hearing aid elements on the sub-chassis assembly.

RALEIGH E. TRESISE.
PAUL D. KENDALL.

REFERENCES CITED

The following references are of record in the file of this patent:

UNITED STATES PATENTS

| Number | Name | Date |
|---|---|---|
| 1,688,976 | Lum | Oct. 23, 1928 |
| 2,306,707 | Mason | Dec. 29, 1942 |
| 2,308,550 | Shapiro | Jan. 19, 1943 |
| 2,327,320 | Shapiro | Aug. 17, 1943 |
| 2,327,321 | Shapiro | Aug. 17, 1943 |
| 2,330,838 | Nelson | Oct. 5, 1943 |
| 2,357,274 | Tresise et al. | Aug. 29, 1944 |
| 2,406,583 | Blauvelt | Aug. 27, 1946 |
| 2,424,422 | Tresise et al | July 22, 1947 |
| 2,431,198 | Posen | Nov. 18, 1947 |
| 2,444,302 | Lybarger | June 29, 1948 |

FOREIGN PATENTS

| Number | Country | Date |
|---|---|---|
| 834,981 | France | Dec. 8, 1938 |